United States Patent [19]
Wood et al.

[11] Patent Number: 5,231,379
[45] Date of Patent: Jul. 27, 1993

[54] AUTOMOBILE HEAD-UP DISPLAY SYSTEM WITH APPARATUS FOR POSITIONING SOURCE INFORMATION

[75] Inventors: Robert B. Wood, Hillsboro; Mark A. Thomas, Beaverton; John P. Desmond, Portland, all of Oreg.

[73] Assignee: Hughes Flight Dynamics, Inc., Culver City, Calif.

[21] Appl. No.: 587,221

[22] Filed: Sep. 24, 1990

Related U.S. Application Data

[60] Division of Ser. No. 409,954, Sep. 15, 1989, Pat. No. 4,961,625, which is a continuation of Ser. No. 98,528, Sep. 18, 1987, abandoned.

[51] Int. Cl.$^5$ ............................................. G09G 3/02
[52] U.S. Cl. ................................... 340/705; 340/980; 359/630; 359/708
[58] Field of Search ................. 350/345, 174; 340/705, 340/980; 353/13, 14; 358/103; 359/630, 708

[56] References Cited

U.S. PATENT DOCUMENTS

| 3,887,273 | 6/1975 | Griffiths | 350/174 |
| 4,218,111 | 8/1980 | Withrington et al. | 350/174 |
| 4,669,810 | 6/1987 | Wood | 350/174 |
| 4,711,544 | 12/1987 | Iino et al. | 353/14 |
| 4,831,366 | 5/1989 | Iino | 340/980 |

FOREIGN PATENT DOCUMENTS

| 3328226 | 2/1985 | Fed. Rep. of Germany | 340/705 |
| 8805553 | 7/1988 | World Int. Prop. O. | 340/705 |
| 8903059 | 4/1989 | World Int. Prop. O. | 340/705 |

*Primary Examiner*—Jeffery A. Brier
*Assistant Examiner*—Jick Chin
*Attorney, Agent, or Firm*—Georgann S. Grunebach; Terje Gudmestad; Wanda K. Denson-Low

[57] ABSTRACT

An optical display system (10) presents visual source information to an observer (18) The display system includes a vision unit (14) that has reflective surfaces (16) through which the observer can view an outside world scene and which reflect source information emanating from an information source (22) for display to the observer In a preferred embodiment, the optical display system constitutes a head-up display system for an automobile and the observer is the driver of the automobile. The vision unit constitutes an automobile windshield with or without a reflection enhancement material and whose inner and outer surfaces reflect source information carried by light propagating form the information source, such as a liquid crystal display (32). A projection lens system (24) positioned between the inner surface of the windshield and the information source has optical light-directing properties for compensating for optical aberrations introduced by the nonplanar windshield surface. The projection lens system includes an aspheric element (262) that is unique to a specific aspheric windshield shape and remaining elements that are common to a great number of different windshield shapes. A positioning mechanism (130) allows the driver to adjust the vertical position of the source information (60) reflected by the windshield within a total display field of view for optimal viewing by a seated driver. The positioning mechanism also automatically changes the distance between the display image and the driver as a function of vehicle speed to promote safe vehicle operation.

19 Claims, 6 Drawing Sheets

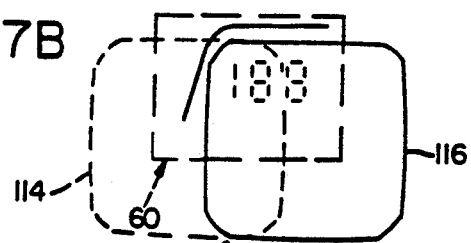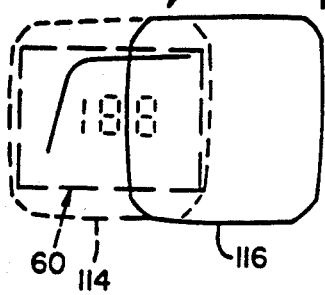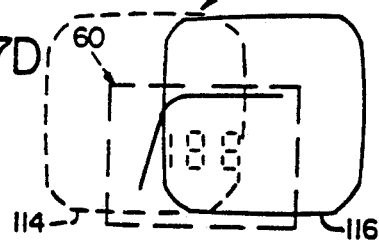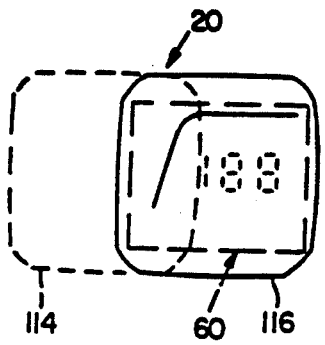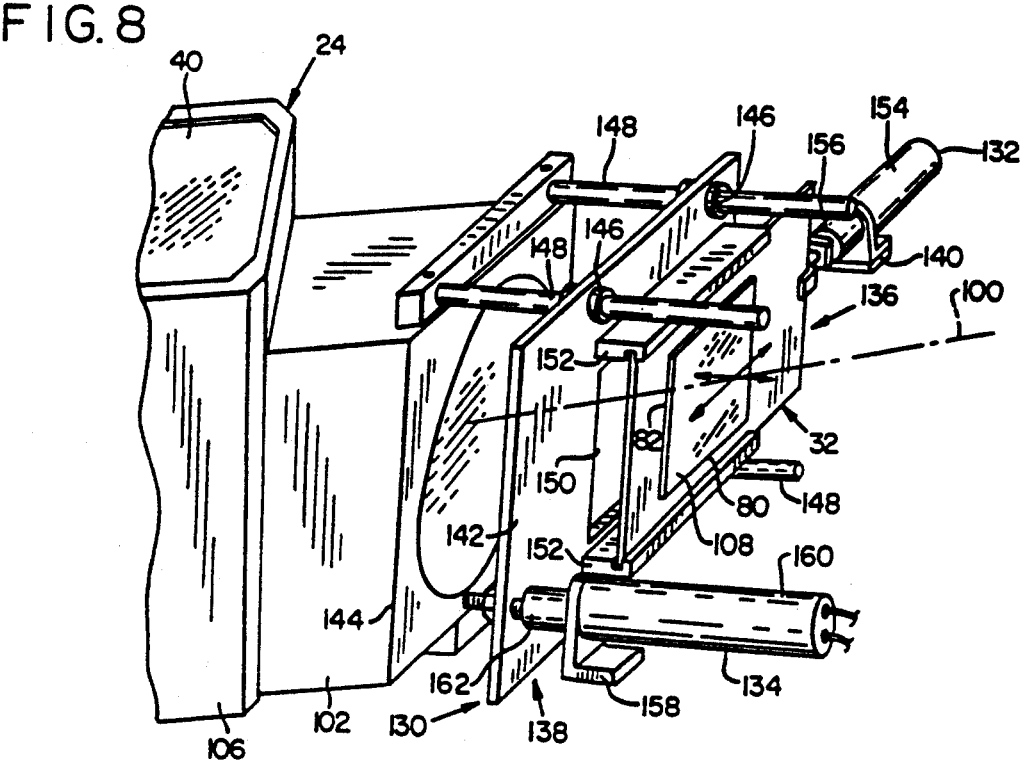

AUTOMOBILE HEAD-UP DISPLAY SYSTEM WITH APPARATUS FOR POSITIONING SOURCE INFORMATION

This is a divisional of application Ser. No. 07/409,954, filed Sep. 15, 1989, now U.S. Pat. No. 4,961,625, which was a continuation of application Ser. No. 07/098,528, filed Sep. 18, 1987, now abandoned.

TECHNICAL FIELD

The present invention relates to optical display systems and, in particular, to a head-up display system for a motor vehicle in which the windshield reflects light carrying visual vehicle data and status information for display to an occupant of the vehicle as the occupant views the outside world scene through the windshield.

BACKGROUND OF THE INVENTION

A head-up display system is an optical display system that employs a combiner element through which an observer views an outside world scene and which reflects visual source information for display to the observer. The source information is typically carried by light emanating from the display surface of a cathode-ray tube. Head-up display systems are typically installed in fighter aircraft so that the pilot can simultaneously monitor critical flight information and observe events occurring outside the aircraft. Conventional combiner elements are of spherical shape and are designed to cooperate with a relay lens to collimate the source information-carrying light so that the display information appears to be coming from optical infinity.

The use of head-up display systems in motor vehicles would likely increase the safe use of and solve space availability problems in such vehicles. In particular, the dashboard area of an automobile has become susceptible to clutter as the trend toward the inclusion of more instrumentation and convenience features continues. The problem of dashboard clutter has heretofore been remedied by the placement of essential control knobs and switches on the steering column. The use of a head-up display system would permit projection of certain vehicle status and performance information, such as engine RPM, vehicle speed, and turn signal indications, forward of the vehicle for display to the driver after reflection from a reflection enhancement material applied to or embedded in the windshield. Projecting such information out in front of the vehicle minimizes the time the driver needs to view the information, thereby enhancing safety in vehicle operation.

A problem inherent in displaying the source information to the observer in this manner is that reflecting light off of a nonplanar surface optically aberrates the light carrying the display information. The surfaces of windshields designed for contemporary automobiles are of complex shapes in that they are typically aspheric with different curvatures in different sections lying in mutually orthogonal planes. The complex shapes stem from aesthetics and from requirements that automobiles exhibit better aerodynamic performance. These requirements dictate that the windshield be inclined at a relatively large slope, i.e., at a "low angle" and be curved near the hood and roof lines of the vehicle so that the windshield forms a complex curvature between its top and bottom margins. The complex shape of the windshield necessitates, therefore, the use of a correction lens having optical light directing properties that compensate for those of the windshield that would otherwise aberrate light carrying the display information.

A problem arising from the need for a correction lens in an automobile head-up display system is that different automobile models or body styles generally require windshields of different profiles. Correction lenses characterized by different optical light directing properties would, therefore, be required to compensate for the optical aberrations introduced by windshield of different profiles.

The windshield must have adequate light transmission properties for the observer to view the outside world scene. Reflection enhancement devices for windshields can be of the wavelength nonselective type, such as a thin metallic or dielectric coating, or of the wavelength selective type, such as a multilayered dielectric coating or a hologram applied to a surface of the windshield or embedded within the laminae of the windshield. A process for embedding a hologram between two laminae of a windshield is described in U.S. Pat. No. 4,842,389 for "Vehicle Display System Using a Holographic Windshield Prepared to Withstand Lamination Process."

The use of a windshield reflection enhancement device imposes certain system design constraints, one of which being the reduction of the photopic transmission of light (i.e., the transmission of light carrying the outside world scene) to the observer. The photopic transmission can be increased by using a wavelength selective device, which reflects light over a narrow bandwidth and thereby maximizes the windshield photopic transmission. The use of a wavelength nonselective device entails a direct tradeoff between display brightness and photopic transmission; whereas, the use of a wavelength selective device offers maximum display brightness and photopic transmission. Another constraint is that the windshield reflection enhancement device be of sufficient quality so that it remains in place and wrinkle free.

SUMMARY OF THE INVENTION

An object of the present invention is, therefore, to provide a head-up display system for an automobile or other vehicle.

Another object of this invention is to provide such a head-up display system that presents substantially aberration-free source information to an occupant in a vehicle having a windshield of complex shape.

A further object of this invention is to provide in a head-up display system a correction lens that is easily adaptable to correct for aberrations introduced by windshields of different shapes.

Still another object of the present invention is to provide a head-up display system using a windshield that employs a reflective surface of high quality and provides maximum transmission of light carrying the outside world scene to an observer situated in the vehicle.

Yet another object of the present invention is to provide a head-up display system having adequate display brightness.

The present invention is an optical display system for presenting visual source information to an observer. The display system includes a vision unit that has a reflective surface through which the observer can view an outside world scene and which reflects source information emanating from an information source for display to the observer. In a preferred embodiment, the optical display system constitutes a head-up display system for a motor vehicle such as an automobile. The vision unit constitutes an automobile windshield with or without a reflection enhancement material and whose inner and outer surfaces reflect information source carried by light propagating from the information source, such as a liquid crystal display. The inner and outer surfaces of the windshield are of aspheric shape having different curvatures in different sections lying in mutually orthogonal planes. The aspheric windshield profile introduces aberrations into the light carrying the source information as it is reflected toward the observer.

A projection lens system positioned between the inner surface of the windshield and the information source has optical light-directing properties for compensating for these optical aberrations. To facilitate compensation of optical aberrations introduced by windshields of different shapes, the projection lens system includes an aspheric element that is unique to a specific windshield shape and remaining elements that are common to a great number of different windshield shapes.

The projection lens system directs the light carrying the source information for reflection off the inner and outer surfaces of the windshield in a region that is substantially outside of the observer's primary operational field of view of the outside world scene. The dimensions of the display surface of the information source are scaled so that the source information displayed is contained within the observer's instantaneous field of view from different head positions.

The display surface of the information source is operatively connected to a positioning mechanism that moves the display surface in the directions transverse to and collinear with the optic axis of the head-up display system. The positioning mechanism allows the observer to adjust the vertical position of the source information reflected by the windshield within the total display field of view defined by the projection lens system for optical viewing by a seated driver. The positioning mechanism also automatically changes the distance between the display image and the driver as a function of vehicle speed to promote safe vehicle operation.

The information source preferably comprises a transmissive liquid crystal display that is illuminated by a high intensity broad band multispectral light source. Thin film color transmissive filters on the liquid crystal source produce multicolored images that are reflected by the windshield. It has been determined that a windshield having a wavelength selective coating that enhances reflectance of a certain color of light can also reflect other colors of light by means of the reflection properties of the external windshield surfaces themselves. Such a wavelength selective element can, if desired, be used to equalize the reflectance of different colors of light carrying the source information.

Additional objects and advantages of the present invention will be apparent from the following detailed description of a preferred embodiment thereof, which proceeds with reference to the accompanying drawings.

BRIEF DESCRIPTION OF THE DRAWINGS

FIGS. 6 and 6A show from the observer's head centered position the alignment of the instantaneous display field of view within the total display field of view of the head-up display system of FIG. 1.

FIGS. 7A-7D show the instantaneous field of view of the head-up display system of FIG. 1 for, respectively, observer head positions 1.25 inches to the left, 1.0 inch up, 1.25 inches to the right, and 1.0 inch down relative to the head centered position of FIG. 6A.

FIG. 8 shows the positioning mechanism for the display surface of the liquid crystal display of FIG. 5.

DETAILED DESCRIPTION OF PREFERRED EMBODIMENT

Figure 1:
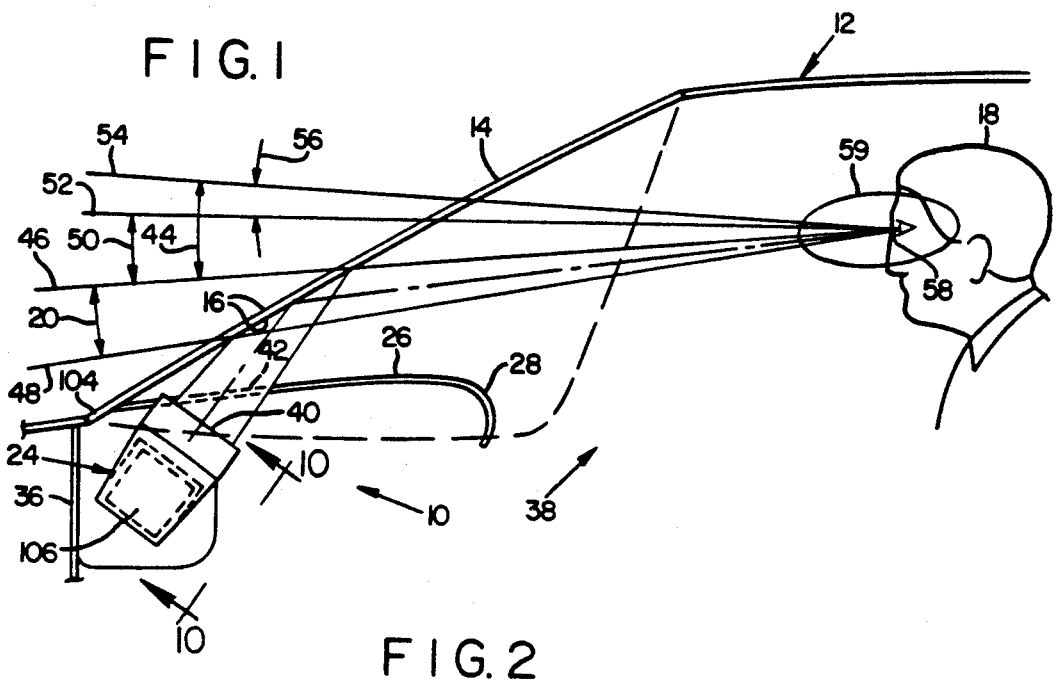
FIG. 1 is a diagram of an optical display system of the present invention installed as a head-up display in an automobile.

FIG. 1 is a diagram of an optical display system 10 installed as a head-up display system for an automobile 12. Head-up display system 10 can be employed in other motor vehicles, such as, for example, trucks and boats. Head-up display system 10 includes a motor vehicle windshield 14 that functions as a vision unit having reflective surfaces 16 through which an observer 18 is situated inside the automobile can view an outside world scene. In the following description, observer 18 is the driver of the automobile. The present invention can be practiced with windshields of many design types, such as a trilayer windshield having two glass plies and a polycarbonate interlayer positioned between them, a bilayer windshield having a glass ply and an inner polycarbonate layer, a single glass ply windshield, an antilacerative windshield, and a combination windshield formed from glass and plastic.

Reflective surfaces 16 reflect source information-carrying light rays in the form of image symbology appearing forward of automobile 12 in the driver's instantaneous display field of view 20 (shown in vertical cross section in FIG. 1 and in horizontal cross section in FIG.

Figure 6:
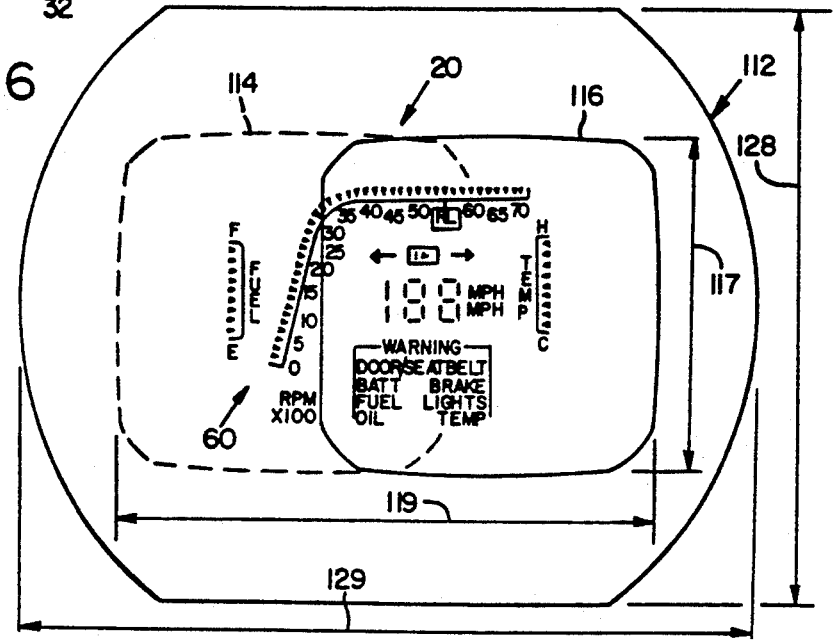

2). (Exemplary display symbology is shown in FIG. 6). Reflective surfaces 16 are the reflection nonenhanced inner and outer surfaces of windshield 14 itself. Windshield 14 may also carry a reflection enhancement material of either the wavelength nonselective type such as an aluminum coating or the wavelength selective type such as a hologram or a multilayered dielectric coating. A reflection enhancement material can be applied on a surface of or embedded within windshield 14. Other suitable reflection enhancement materials could include an indium tin oxide coating used in a heatable windshield and a light and heat reflective coating used on certain windshields.

Figure 5:
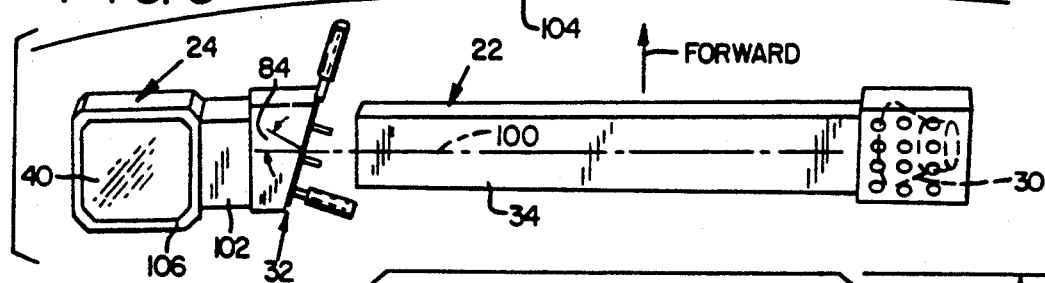
FIG. 5 is a plan view with portions cut away to show in the automobile of FIG. 1 the projection lens system and the information source mounted immediately below and forward of the upper surface of the dashboard.

With reference to FIGS. 1 and 5, the source information-carrying light rays emanate from an information source 22 to a projection lens system 24, both of which are mounted beneath the top surface 26 of the automobile dashboard 28. Information source 22 includes a light source 30 and a liquid crystal display 32 separated by a light pipe 34. Information source 22 and projection lens system 24 are mounted behind the engine compartment firewall 36 but outside the passenger compartment 38 to protect liquid crystal display 32 from the heat generated by light source 30. The source information-carrying light rays propagate from liquid crystal display 32 and emerge from output 40 of projection lens system 24 through an opening 42 in top surface 26 of dashboard 28 for reflection off reflective surfaces 16 toward driver 18.

Driver 18 views the outside world scene within a normal operational field of view 44 (shown in vertical cross section in FIG. 1 and in horizontal cross section in FIG. 2), which is positioned above and is substantially nonoverlapping of display field of view 20. Display field of view 20 describes a maximum angle of about 12° in the vertical plane between lines 46 and 48, line 46 describing an angle 50 of about 5° relative to the horizon line 52. Operational field of view 44 describes an angle of about 15° in the vertical plane between lines 54 and 46, line 54 describing an angle 56 of about 10° relative to horizon line 52. Each of the lines 46, 48, 52, and 54 is drawn from point 58, which is the center of a vehicle eye ellipse 59. The eye ellipse 59 for a vehicle is that nominal spatial envelope for safe operation of the vehicle. These lines intersect windshield 14 to define the vertical dimensions of the fields of view 20 and 44 on windshield 14, as described in greater detail below.

Figure 2:
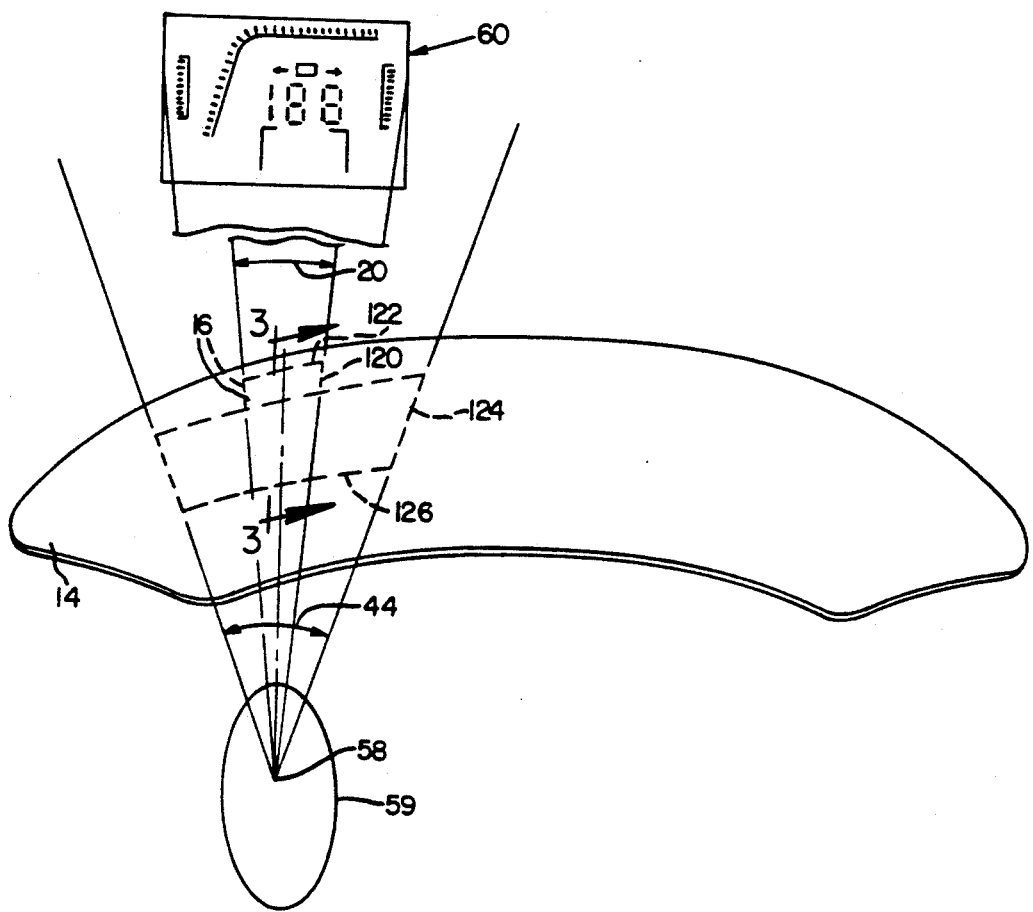
FIG. 2 is a plan view of the automobile windshield of FIG. 1 showing the observer's operational field of view of the outside world scene and the observer's display field of view of the source information.

FIG. 2 is a plan view of windshield 14 showing the position of windshield 14 used for the driver's operational field of view 44 of the outside world scene and the position of windshield 14 through which driver 18 views the total display field of view 20 of the source information. With reference to Figs. 1 and 2, operational field of view 44 defines the normal region of space driver 18 views the real world from the head centered position while operating automobile 12. The head centered position is the orientation of the driver's head when both eyes are symmetrically positioned about point 58. Display field of view 20 defines an area on windshield 14 through which driver 18 views the display. The top side margin of display field of view 20 is angularly displaced from the driver's direct line of sight by angle 50. FIG. 2 shows the display image symbology 60 (rotated into the plane of the figure for purposes of clarity) appearing at a distance forward of driver 18 and beyond reflective surfaces 16. The intersection of display field of view 20 with windshield 14 has a vertical dimension 120 and a horizontal dimension 122. The intersection of operational field of view 44 with windshield 14 has a vertical dimension 124 and a horizontal dimension 126.

Figure 3A:
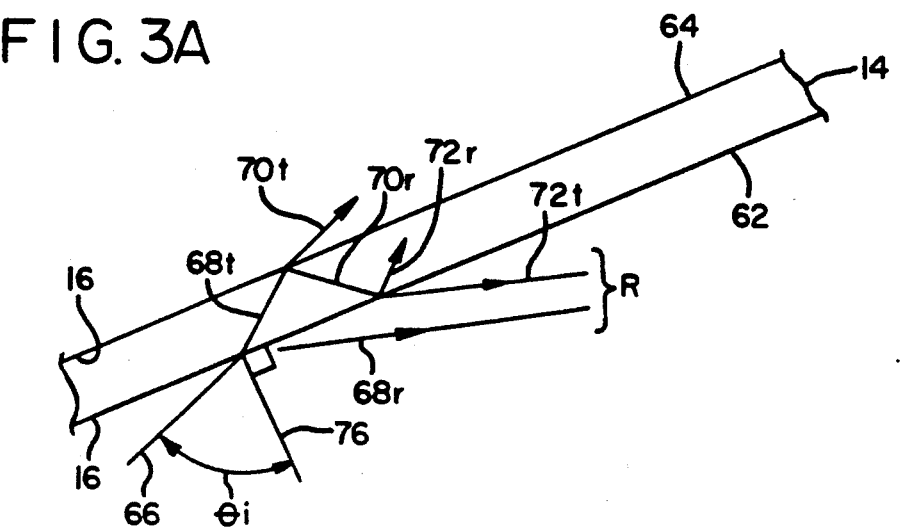
FIGS. 3A and 3B are fragmentary cross sectional views taken along lines 3—3 of FIG. 2 showing the source information light reflecting surfaces of, respectively, reflection nonenhanced and reflection enhanced automobile windshields.
Figure 3B:
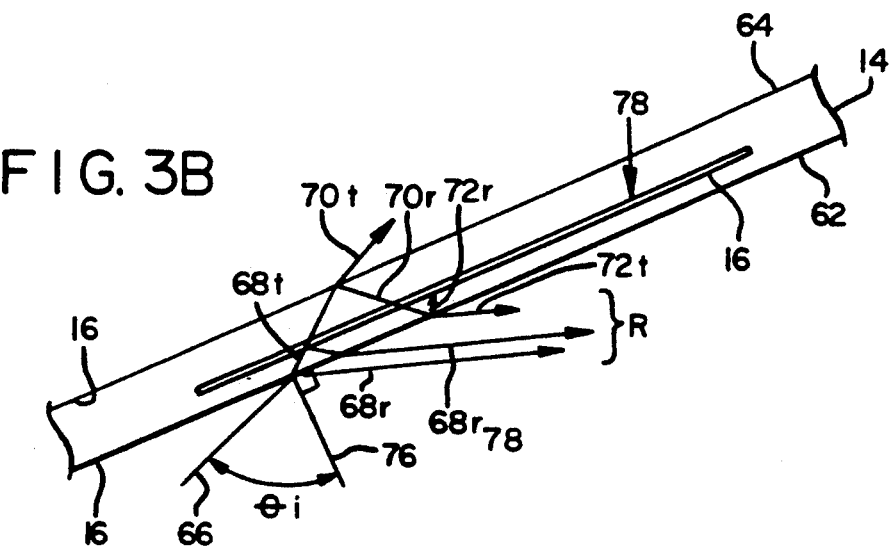

FIGS. 3A and 3B are fragmentary cross sectional side views showing the reflective surfaces 16 of, respectively, a reflection nonenhanced and reflection enhanced windshield 14. With reference to FIG. 3A, a windshield 14 made of glass has an inner major surface 62 and an outer major surface 64 that form air-glass boundaries. An exemplary light ray 66 propagating from projection lens system 24 (FIG. 1) strikes inner surface 62 and decomposes into a transmission component $68_t$ of greater intensity and a reflection component $68_r$ of lesser intensity. Transmission component $68_t$ propagates through windshield 14 and strikes the air-glass interface formed by outer surface 64. Light component $68_t$ decomposes into a transmission component $70_t$ of greater intensity and a reflection component $70_r$ of lesser intensity, the transmission component propagating through the air and unnoticed by driver 18, and the reflection component $70_r$ propagating back through windshield 14 toward the air-glass interface of inner surface 62.

Reflection component $70_r$ strikes inner surface 62 and decomposes into a reflection component $72_r$ of lesser intensity that propagates back through windshield 14 and a transmission component $72_t$ of greater intensity that propagates toward driver 18 after refraction at inner surface 62. The intensity of reflection component $72_r$ is of insignificant amount. The total intensity "R" representing the sum of reflection component $68_r$ and transmission component $72_t$ is of a sufficient amount to provide driver 18 with source information of high brightness.

With reference to FIG. 3B, windshield 14 includes a reflection enhancement element 78, which can be, for example, a wavelength selective element such as a hologram or a wavelength nonselective element such as a metallic coating. Reflection enhancement element 78 intercepts light component $68_t$ and reflects a substantial portion of it as light component $68_{r78}$. The remaining light energy in transmission component $68_t$ strikes outer surface 64, propagates back through windshield 14, and strikes reflection enhancement element 78. The reflection component $70_r$ propagating through reflection enhancement element 78 of FIG. 3B is of substantially less intensity than that of reflection component 70, propagating only through the glass of FIG. 3A. The total intensity "R" representing the sum of reflection components $68_r$ and $68_{r78}$ and transmission component $72_t$ is about 50% greater than the total intensity "R" of the windshield of FIG. 3A. It will be appreciated that the intensities of unused light components $70_t$ and $72_r$ of FIG. 3B are substantially less than those of FIG. 3A.

Figure 4:
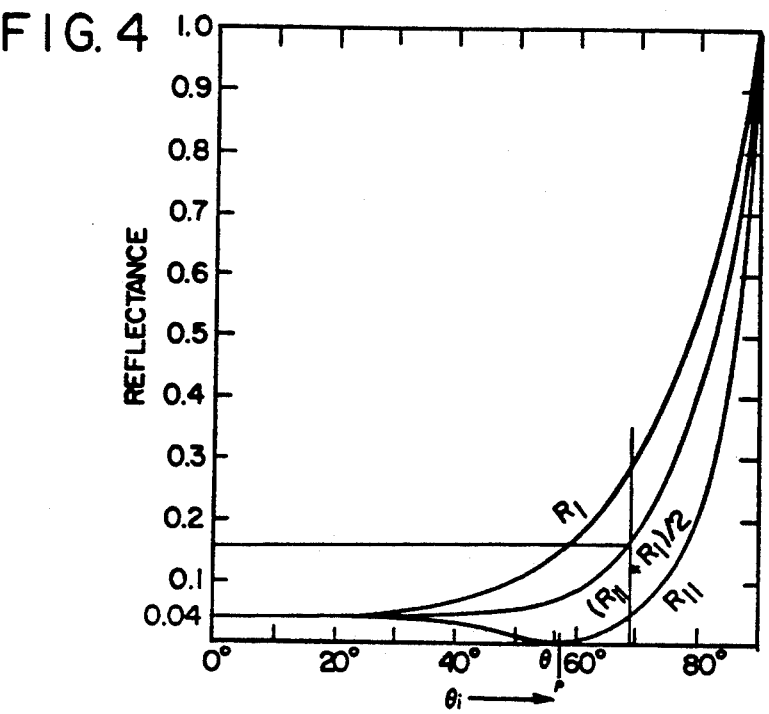
FIG. 4 is a graph showing the light reflection characteristics of a single glass windshield surface as a function of different angles of incident light.

FIG. 4 is a graph showing the reflection characteristics of a single glass surface as a function of the angle of incidence $\Theta_i$. In FIG. 4, the single surface corresponds to inner surface 62 of FIGS. 3A and 3B; and the curves $R_\perp$ and $R_\parallel$ represent the electric field components perpendicular and parallel, respectively, to the light wavefront plane of incidence, which has an angle of incidence $\Theta_i$ relative to a local surface normal 76.

FIG. 4 reveals that for the reflection nonenhanced windshield 14 of FIG. 3A having a refractive index $n_t = 1.5$ and an angle of incidence $\Theta_i$ of about 68°, the average reflectance of a single surface is about 16% of incident light and the average reflectance of two surfaces is about 24%. This represents the superposition of 16% and 8% contributions of light components $68_r$ and $72_t$, respectively. FIG. 4 reveals that the reflection enhanced windshield of FIG. 3B under the same conditions reflects about 33.4% of incident light. This represents the superposition of 16%, 15%, and 2.4% contributions of light components $68_r$, $68_{r78}$, and $72_t$, respectively. Angles of incidence $\Theta_i$ of such magnitudes are readily available with windshields inclined at relatively large slopes. FIG. 4 indicates that an angle of incidence $\Theta_i$ of about 60° provides for two surfaces a reflectance of about 18%, which is about the minimum reflectance needed to provide acceptable display brightness.

FIG. 5 is a top view of automobile 12 with a portion of dashboard 28 cut away to show the mounting of information source 22 and projection lens system 24. With reference to FIG. 5, a preferred information source 22 includes a broad band multispectral light source 30 and a transmissive liquid crystal display 32 but can be, for example, a cathode-ray tube or a light emitting diode display. Light source 30 and liquid crystal display 32 are separated by an internally reflecting tubular light pipe 34. Light source 30 is preferably a high intensity projection lamp, such as, for example, a type EYF 12 volt quartz lamp manufactured by General Electric Co. This lamp dissipates about 75 watts of heat at its maximum brightness. To increase the display contrast, light source 30 preferably includes a faceted dichroic reflector that directs the light of about 11,500 center candlepower with a 14° beam spread along the length of light pipe 34 but allows the dissipation of heat in all directions. Liquid crystal display 32 comprises a liquid crystal cell 80 (FIG. 8) of the twisted nematic type configured as a matrix of transmissive segments that cooperate with light polarizing filters to selectively transmit light to synthesize source information in the form of symbology 60. The segments of liquid crystal cell 80 can be individually addressed for a high contrast display. Liquid crystal cell 80 can also be fabricated as an array of pixels to provide, for example a map display. Display surface 82 (FIG. 8) is inclined at an angle 84 of about 12° relative to the display system optic axis 100 for reasons described below with reference to FIG. 5.

Light pipe 34 facilitates the placement of light source 30 at a convenient location where heat generated by the light source can be dissipated away from liquid crystal display 32. Light pipe 34 could be constructed of a transparent plastic tube or rod having a reflective coating, but is preferably constructed of aluminum tubing that is designed to efficiently transfer light emitted from light source 30 to liquid crystal display 32. The inner surface of light pipe 34 is preferably polished, nickel plated, or extruded such that the surface finish is smooth and shiny, thereby maximizing light transmission. The use of aluminum promotes the efficient dissipation of heat generated by light source 30.

Projection lens system 24 projects the source information appearing on display surface 82 of liquid crystal display 32 so that the source information reflected by windshield 14 appears to come from a distance of between about two and ten meters forward of the vehicle. Projection lens system 24 includes multiple lens elements fabricated from either plastic or glass materials and has optical light directing properties that project source information forward of automobile 12 and compensate for optical aberrations resulting from the complex shape of windshield 14. The optical design of projection lens system 24 is further described below.

Projection lens system 24 is composed of two sections joined at their ends to form a structure having a right angle bend, one section 102 extending parallel to the bottom side margin 104 of windshield 14 and the other section 106 being oriented so that it directs light carrying the source information up toward reflective surfaces 16 of windshield 14. An internally mounted mirror folds the optic axis 100 of projection lens system 24. The right angle bend allows projection lens system 24 to clear the steering column, but a suitable lens system could be designed with an unfolded optic axis.

The use of wavelength selective coating in conjunction with thin film color transmission filters applied to the light incident surface 108 (FIG. 8) of liquid crystal cell 80 can be used to equalize the reflectance of different colors of light carrying the source information. This can be achieved using a windshield having reflective surfaces of the reflection nonenhanced and wavelength selective reflection enhanced types.

For example, the preferred light source 30 employed in the present invention emits spectral components of red and green light. The intensity of the red light is greater than that of the green light. Providing a hologram 78 constructed to reflect the green light and using the inner and outer surfaces to reflect most of the red light provides a multicolor display image in color components of perceptibly equal intensities.

FIG. 6 shows the instantaneous display field of view 20 from the head centered position and the total display field of view 112 of head-up display system 10. With reference to FIG. 6, instantaneous display field of view 20 is that portion of the total system display field of view 112 visible from a fixed head position. Each of the driver's eyes sees a different portion of instantaneous display field of view 20, the right eye seeing portion 114 and the left eye seeing a portion 116. The instantaneous display field of view 20 is defined by the size of the exit aperture of projection lens system 24 and its position relative to reflective surfaces 16 of windshield 14, and the distance between windshield 14 and driver 18. Total display field of view 112 is defined by the design of projection lens system 24. A different portion of total display field of view 112 is visible instantaneously to driver 18 from different vertical head positions. Liquid crystal display 32 is adjustable so that display symbology 60 can be centered within the vertical limits of vehicle eye ellipse 59 (FIGS. 1 and 2).

FIG. 6 shows that the design of head-up display system 10 makes visible all of the source information from the head centered position. Head-up display system 10 provides an instantaneous display field of view 20 from any head position within an eye ellipse 59. Display field of view 20 has a vertical angular subtense 117 of about 6.75° and a horizontal angular subtense 119 of about 10.75°. The dimensions of symbology 60 are scaled so that all of the source information can be visible from any fixed head position within the limits of eye ellipse 59, as described below in greater detail. The total display field of view 112 with head motion has a vertical angular subtense 128 of about 12° and a horizontal angular subtense 129 of about 14.75°.

FIGS. 7A-7D show the instantaneous display fields of view from a variety of head positions. For purposes of clarity, the area occupied by symbology 60 has been shown in broken outline and FIG. 6 has been redrawn to provide the head center position as a reference against which instantaneous fields of view positions of FIG. 7A-7D can be compared. FIGS. 7A and 7C show that all of the display is visible to the observer with about 7.5 cm of horizontal head motion. FIGS. 7B and 7D show that portions of the source information could be lost to the observer if display surface 96 of liquid crystal display 32 were not adjustable. Horizontal adjustments of display surface 82 permit the display of source information to be centered from any vertical head position within the eye ellipse. Operators of many different heights can, therefore, adjust the display for easy viewing.

FIG. 8 shows a positioning mechanism 130 for positioning display surface 82 of liquid crystal display 32 in the horizontal and axial directions. With reference to FIG. 8, positioning mechanism 130 comprises a pair of motor-driven micrometers 132 and 134 of similar design that are components of a horizontal translation stage 136 and an axial translation stage 138, respectively. Horizontal translation stage 136 includes a support bracket 140 that is secured to a plate 142 positioned across the input end 144 of projection lens system 24. Plate 142 has three bushings 146 (only two shown) through which parallel rods 148 of fixed length pass. Rods 148 are positioned at and extend outwardly of input end 144 of projection lens 24 so that plate 142 can slidably move in the direction of optic axis 100, as will be described below.

Plate 142 has a rectangular aperture 150 across which liquid crystal display 32 is slidably mounted for horizontal movement along a pair of parallel U-shaped guide members 152 secured to plate 142. Micrometer 132 includes a tubular body 154 that houses an extensible rod 156 whose free end is secured to liquid crystal display 32. Extensible rod 156 moves in either direction along the length of tubular body 154 in response to a first electrical control signal, which can be manually applied by driver 18 situated in automobile 12. Moving extensible rod 156 changes the position of display surface 82 of liquid crystal display 32 in a direction transverse of optic axis 100. This has the effect of changing the vertical position of the source information display to driver 18. The reason that horizontal movement of liquid crystal display 32 changes the vertical position of the source information display is that projection lens system 24 is configured to fold optic axis 100 and thereby change the propagation direction of light passing through it. The ability to change the vertical position of the source information facilitates viewing by drivers of different heights.

Axial translation stage 138 includes a support bracket 158 that is secured to the body of automobile 12. Micrometer 134 includes a tubular body 160 that houses an extensible rod 162 whose free end is secured to plate 142 and which moves in a direction generally parallel to optic axis 100 in response to a second electrical control signal. Moving extensible rod 162 changes the distance between display surface 82 and input end 144 of projection lens system 24. This has the effect of changing the distance between the image of the display information 60 and driver 18. The ability to change this distance promotes safe operation of automobile 12 by allowing driver 18 to focus his eyes on the displayed image at a distance to which driver 18 would be normally directing his attention during high speed operation of automobile 12. This distance would normally be the distance between automobile 12 and the vehicle in front of it. Driver 18 would not, therefore, need to take the time to refocus his eyes under conditions in which driver 18 has less time to react to change in driving conditions and situations.

Figure 9A:
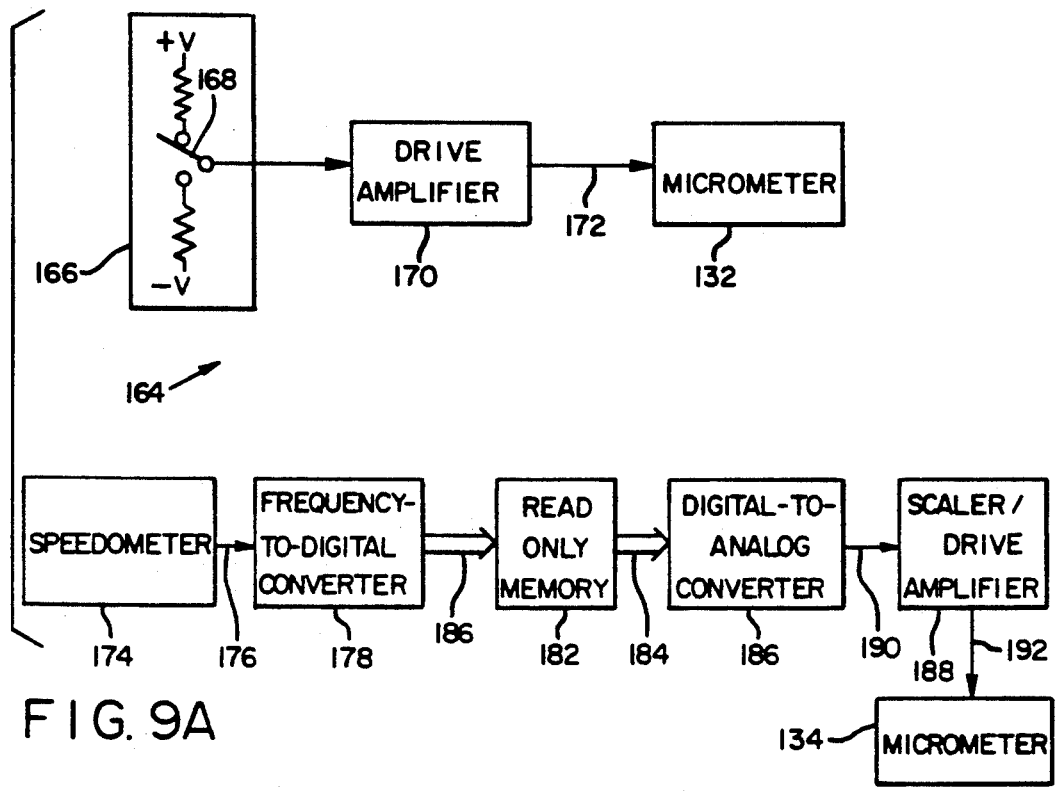
FIG. 9A is a block diagram of an electrical circuit for developing control signals for the positioning mechanism of FIG. 8.

FIG. 9A is a block diagram of an electrical circuit 164 for developing the first and second electrical control signals delivered to positioning mechanism 130 to adjust the position of liquid crystal display 32. With reference to FIG. 9A, driver 18 manually produces the first control signal by operating a two-pole double-throw switch 166 to position the display information vertically. The poles of switch 166 are connected to different ones of voltages of magnitudes +V and −V. Driver 18 selectively changes the position of a movable contact 168 of switch 166 to make electrical contact with one of the poles and thereby selectively provide either +V or −V to the input conductor of a drive amplifier 170. Drive amplifier 170 provides on its output conductor 172 an electrical current of sufficient magnitude to drive motor-driven micrometer 132. The polarity of the voltage applied to drive amplifier 170 determines the direction of drive current flow, thereby controlling the direction of movement of extensible rod 156 and the vertical position of the source information 60 displayed to driver 18. To maintain the display information in the desired vertical position, driver 18 removes his hand from switch 166 so that no voltage is applied to drive amplifier 170 to keep extensible rod 156 of micrometer 132 stationary.

The image distance is automatically derived from the speed of automobile 12. A speedometer 174 develops a variable frequency output signal that is delivered on a conductor 176 to the input of a frequency-to-digital converter 178. A parallel digital word representing the speed of automobile 12 appears on the outputs of analog-to-digital converter 178 and is delivered on conductors 180 to the address inputs of a read only memory 182. Read only memory 182 is a look-up table preprogrammed to include digital words representing image distances to which different vehicle speeds correspond. The appropriate digital word is delivered on a conductor 184 to the input of a digital-to-analog converter 186, which converts the digital word to an analog signal voltage. A scaler-drive amplifier 188 receives on a conductor 190 the analog signal voltage present on the output of digital-to-analog converter 186 and conditions it to deliver on a conductor 192 a signal of the proper magnitude and polarity to move extensible rod 162 of micrometer 134 to the proper position. To keep the image distance fixed, no voltage signal is applied to micrometer 134 until the vehicle speed changes.

Figure 9B:
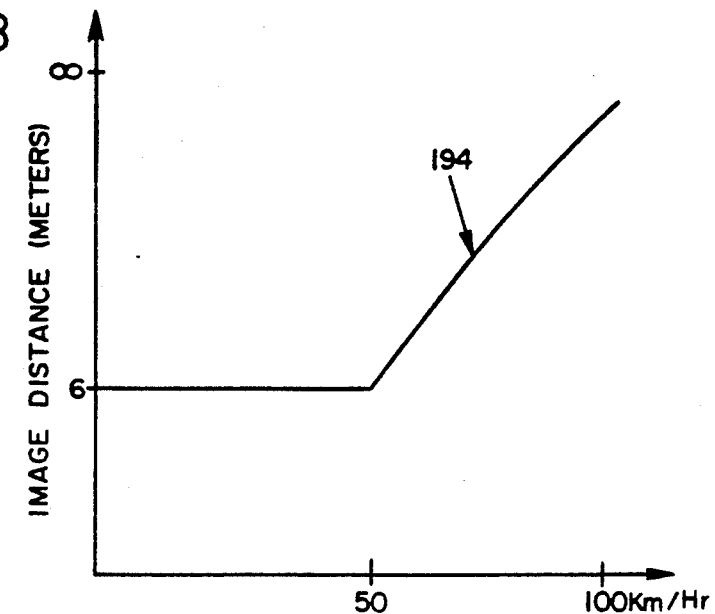
FIG. 9B shows a graphical representation of an exemplary function of image distance versus vehicle speed implemented in the circuit of FIG. 9A to determine the axial position of the positioning mechanism of FIG. 8.

FIG. 9B shows an exemplary curve 194 from which the digital words inscribed in read only memory 182 can be derived. Curve 194 shows that the image distance from driver 18 remains constant at about 6 meters for vehicle speeds of less than about 50 km/hr. The image distance increases asymptotically toward infinity as the vehicle speed increases to about 100 km/hr. Of course, other image distance profiles as a function of vehicle speed can be inscribed into read only memory 182.

Figure 10:
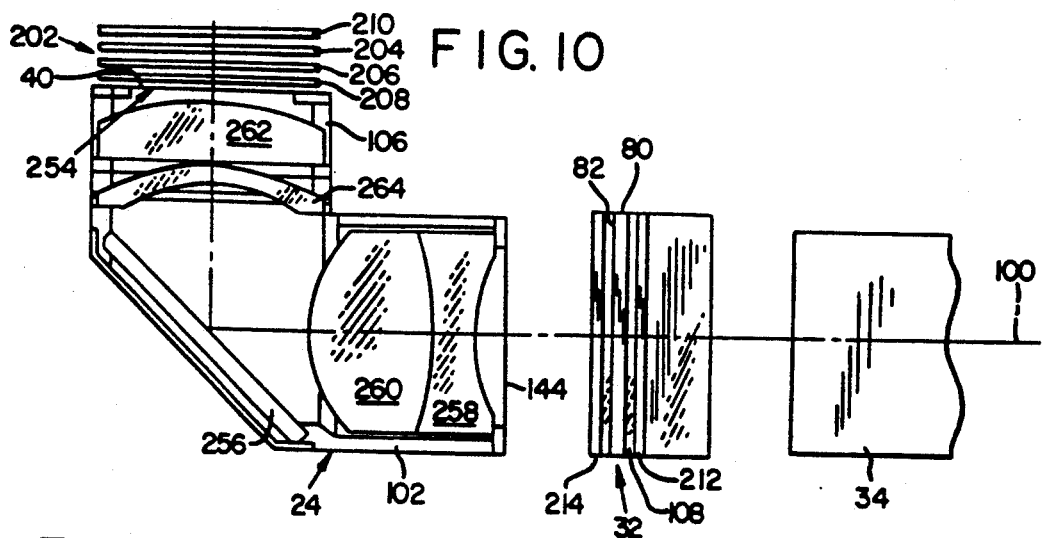
FIG. 10 is a schematic diagram taken along lines 10—10 in FIG. 1 showing the optical components positioned at the output of the projection lens system to avert display surface damage resulting from entry of sunlight into the projection lens system of lens system of FIG. 5.

FIG. 10 is a schematic diagram of the optical components that cooperate with projection lens system 24 and liquid crystal display 32 to present the source information to driver 18 and to prevent damage to display surface 82 resulting from the entry of sunlight into the output end 40 of projection lens system 24. Projection lens system 24 is rotated to the plane of FIG. 10 to show the optical components positioned adjacent output end 40. With reference to FIG. 10, sunlight of sufficient intensity entering output end 40 of projection lens system 24 converges to and can cause melting of a small region of display surface 82 of liquid crystal cell 80. Display surface 82 can withstand a burn threshold density of about 500 W/in$^2$, but the focal power of a preferred projection lens system 24 can provide a sunlight power density of as much as about 2500 W/in$^2$ at the region.

It is known that imparting circular polarization to sunlight entering the output end of a lens system can reduce the intensity of the sunlight as it propagates through the lens system. Moreover, a circular polarizer reduces the intensity of sunlight reflected from the surfaces of lens elements 258, 260, 262, and 264 and visible to driver 18. A circular polarizer 202 that comprises a neutral density linear polarizing filter 204 and a quarter-wave plate 206 positioned as shown in FIG. 10 accomplish this task for projection lens system 24. Further rejection of incoming sunlight is accomplished by the inclusion of an infrared light rejection filter 208, which eliminates the infrared spectral components of incident light and thereby reduces the quantity of sunlight entering projection lens system 24. Rejection filter 208 is most effective in the position immediately adjacent output end 40 of projection lens system 24.

A quarter-wave plate 210 is positioned to receive but has no material effect on the randomly polarized incident sunlight as it strikes polarizing filter 204. The function of quarter-wave plate 210 is described below with reference to FIG. 11. A neutral density linear polarizing filter 212 positioned to receive the light propagating from light source 30 (FIG. 5) and exiting light pipe 34 linearly polarizes the light that illuminates liquid crystal display 32.

Liquid crystal display 32, which includes liquid crystal cell 80 preferably of the twisted nematic type, changes the polarization direction of the light passing through it in response to a voltage signal applied to each one of the display segments. Polarizing filter 204 functions as an analyzer for liquid crystal display 32. A quarter-wave plate 214 positioned between input end 144 of projection lens system 24 and liquid crystal display 32 imparts circular polarization to light exiting liquid crystal display 32 for the reasons state below with reference to FIG. 11.

Figure 11:
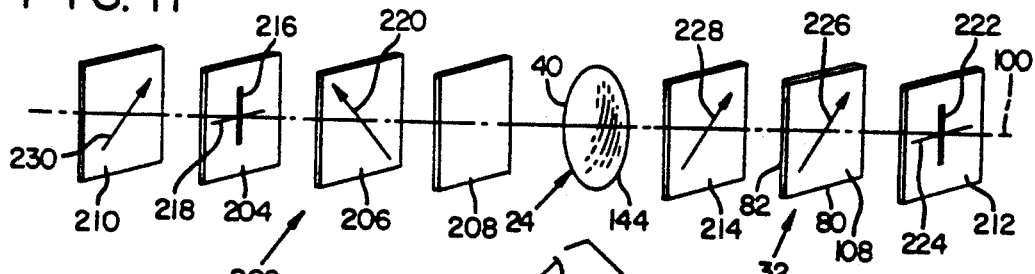
FIG. 11 shows the orientation of the optical components depicted in FIG. 10.

FIG. 11 is a diagram showing the arrangement and orientations of the optical components depicted in FIG. 10. (For purposes of clarity, projection lens system 24 is represented in FIG. 11 as a single lens element.) The optical components are selected and arranged so that greatly attenuated circularly polarized sunlight strikes display surface 82 of liquid crystal display 32 and source information carried by circularly polarized light of maximum intensity exits quarter-wave plate 210 for display to driver 18.

With reference to FIGS. 10 and 11, randomly polarized sunlight propagating from left to right in FIG. 11 along optic axis 100 passes through quarter-wave plate 210 and strikes polarizing filter 204. The absorption axis 216 of polarizing filter 204 absorbs about 50% of the randomly polarized incident sunlight energy. Transmission axis 218 of polarizing filter 204 transmits horizontally polarized sunlight to quarter-wave plate 206, whose optic axis 220 is inclined at a 45° angle relative to polarization axes 216 and 218 of polarizing filter 204 to transmit left-circularly polarized sunlight to rejection filter 208. Circularly polarized sunlight emerges from quarter-wave plate 206 and rejection filter 208 and enters output end 40 of projection lens system 24. The intensity of the sunlight entering projection lens system 24 is substantially reduced by reason of the insertion losses of infrared rejection filter 208, polarizing filter 204, and quarter-wave plates 206 and 210, together with the operation of rejection filter 208 and absorption axis 218 of polarizing filter 204. The resulting reduction in sunlight intensity in conjunction with the introduction of circular polarization reduces the sunlight power density on display surface 82 of liquid crystal display 32 below the 500 W/in.$^2$ burn threshold.

The randomly polarized light emanating from light source 30 (FIG. 5) and propagating from right to left in FIG. 11 along optic axis 100 strikes polarizing filter 212. The absorption axis 222 of polarizing filter 212 absorbs about 50% of the randomly polarized incident light energy. Transmission axis 224 of polarizing filter 212 transmits horizontally polarized light to liquid crystal display 32, whose optic axis 226 is inclined at an angle with respect to polarization axes 222 and 224 of polarizing filter 212 to transmit either vertically or horizontally polarized light in response to the voltage signals applied to the segments of liquid crystal display 32. The light exiting display surface 82 of liquid crystal display 32 strikes quarter-wave plate 214, whose optic axis 228 is inclined at a 45° angle relative to the polarization directions of light exiting liquid crystal display 32 to provide circularly polarized light to input end 144 of projection lens system 24.

Since optic axes 220 and 228 of the respective quarter-wave plates 206 and 214 are orthogonally aligned, there is zero net retardation imparted to them to light exiting display surface 82 of liquid crystal display 32. Only horizontally polarized light propagates through polarization axis 218 of polarizing filter 204, which functions as an analyzer, as was stated above. The optic axis 230 of quarter-wave plate 210 is inclined at a 45° angle relative to polarization axes 216 and 218 of polarizing filter 204 to provide left-circularly polarized light to reflective surfaces 16 of windshield 14 (FIG. 1). The circularly polarized light ensures that driver 18 wearing polarized sunglasses will see the display source information.

It will be appreciated that the use of quarter-wave plates 206 and 214 promote the maximum transmissivity of light propagating from liquid crystal display 32 because polarizing filter 204 either completely absorbs or completely transmits the linearly polarized light incident to it. Moreover, since circularly polarized light propagates through lens system 24, the set of optical components 204, 206, and 210 and the set of the optical components 80, 212, and 214 can be angularly displaced relative to each other (i.e., rotated) about optic axis 100 without changing the transmissivity of either the sunlight or the light carrying the source information.

Antireflection coatings are applied to all of the exposed surfaces of the lens elements of projection lens system 24 to maximize light transmission through it. The use of wavelength selective reflection enhancement material in windshield 14 would also reduce the amount of sunlight entering projection lens system 24.

Figure 12:
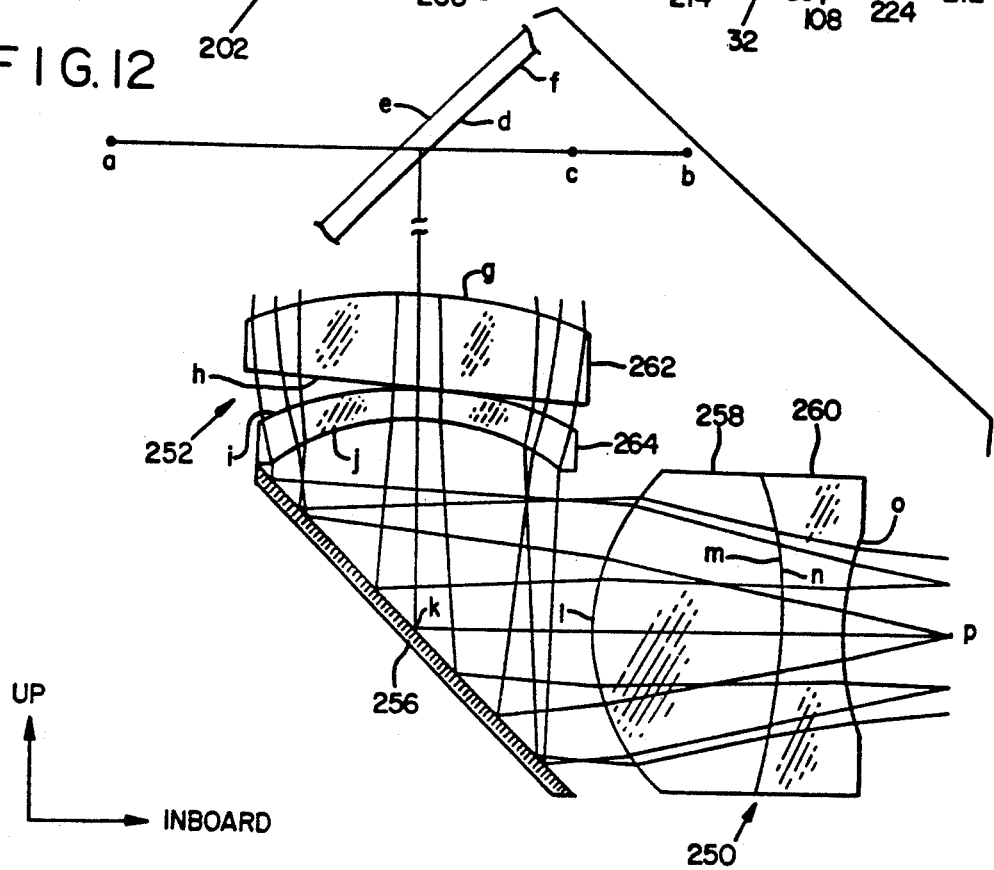
FIG. 12 is a diagram of the optical components of the projection lens system comprising a part of the head-up display system of FIG. 1.

FIG. 12 is a diagram of the optical components of projection lens system 24. With reference to FIG. 12, projection lens system 24 projects a virtual image of display information into the driver's field of view by reflecting off reflective surfaces 16 the light emanating from display surface 82. Reflective surfaces 16 of windshield 14 are curved with an asymmetrical shape in the portion of windshield 14 intended for use; therefore, projection lens system 24 is designed to compensate for nonsymmetric image aberrations caused by the shape of windshield 14. A special aspheric surface is used in the design of projection lens system 24 to correct the nonsymmetric aberrations and distortion introduced. The preferred projection lens system 24 may be designed to employ either glass or plastic elements.

The design uses four elements, three of which are of conventional rotationally symmetric types with spherical surfaces, and one plano-convex element in which the convex surface is of special aspheric shape. FIG. 12 shows the general layout of projection lens system 24 in two lens "doublet" groups and an internal fold mirror. The first element positioned nearest the windshield is rotated about optic axis 100, and its cross sectional projection is shown in FIG. 12.

The spectral range for projection lens system 24 includes visible light ranging from between 490 and 620 nanometers. This range of wavelengths requires that color correction be controlled and
checked. The instantaneous field of view is determined by the distance away and size of the exit aperture with respect to the design eye, i.e., the center of ellipse 59, of head-up display system 10. Fixing the above parameters with respect to each other establishes the maximum instantaneous field of view. The total field of view depends on the allowed excursion of the driver's head, the size of display surface 82, and the focal length of projection lens system 24. The image presented to driver 18 is preferably not positioned at infinity.

The design of a lens system that compensates for the curvature of windshield 14 requires that the windshield curvature itself be characterized. This is accomplished by obtaining windshield sag data either by empirical measurements or from the windshield manufacturer's design specifications. Table I presents windshield sag data for an exemplary windshield. The windshield sag data was measured relative to a best fit plane and the compound angle of the windshield relative to an orthogonal coordinate system centered at eye ellipse 59 of head-up display 10. The angle of the best fit plane is characterized by a horizontal tilt angle equal to 2.712° and a vertical tilt angle equal to 68.325°. The X and Y coordinates are measured with respect to the center of region 20 on windshield 14.

TABLE I

| | WINDSHIELD SAG DATA | | | |
|---|---|---|---|---|
| Position | X Coordinate | Y Coordinate | Measured Sag | Computer Sag |
| 1 | 2.9881 | 2.9955 | 0.1235 | 0.1235 |
| 2 | 3.0002 | 1.4804 | 0.1180 | 0.1184 |
| 3 | 3.0045 | −0.0172 | 0.1121 | 0.1122 |
| 4 | 3.0030 | −1.5071 | 0.1048 | 0.1041 |
| 5 | 3.0070 | −3.0157 | 0.0931 | 0.0931 |
| 6 | 1.5060 | 2.9982 | 0.1495 | 0.1497 |
| 7 | 1.49838 | 1.4963 | 0.1452 | 0.1451 |
| 8 | 1.4958 | −0.0133 | 0.1392 | 0.1393 |
| 9 | 1.5079 | −1.5032 | 0.1316 | 0.1315 |
| 10 | 1.4977 | −3.0085 | 0.1215 | 0.1214 |
| 11 | −0.0053 | 2.9991 | 0.1597 | 0.1598 |
| 12 | −0.0086 | 1.4949 | 0.1552 | 0.1551 |
| 13 | 0.0 | 0.0 | 0.1493 | 0.1493 |
| 14 | −0.0079 | −1.1508 | 0.1419 | 0.1418 |
| 15 | −0.0043 | −3.0129 | 0.1318 | 0.1319 |
| 16 | −1.5044 | 2.9952 | 0.1517 | 0.1513 |
| 17 | −1.5016 | 1.4917 | 0.1467 | 0.1462 |
| 18 | −1.5041 | −0.0122 | 0.1404 | 0.1403 |
| 19 | −1.5021 | −1.5091 | 0.1330 | 0.1329 |
| 20 | −1.4947 | −3.0199 | 0.1230 | 0.1231 |
| 21 | −3.0045 | 2.9938 | 0.1224 | 0.1224 |
| 22 | −3.0079 | 1.4933 | 0.1169 | 0.1166 |
| 23 | −3.0034 | −0.0140 | 0.1103 | 0.1104 |
| 24 | −2.9927 | −1.5163 | 0.1029 | 0.1030 |
| 25 | −2.9886 | −3.0098 | 0.0934 | 0.0934 |

The data presented in Table I were fit to the following two dimensional third order rotationally nonsymmetric polynomial:

$$Sag = A + BX + CY + EX^2 + FXY + GY^2 + HX^3 + IX^2Y + JXY^2 + KY^3,$$

where $A = 1.49321 \times 10^{-1}$, $B = 5.64422 \times 10^{-4}$, $C = 4.32024 \times 10^{-3}$, $E = -4.20469 \times 10^{-3}$, $F = 1.27263 \times 10^{-5}$, $G = -3.81329 \times 10^{-4}$, $H = 9.62663 \times 10^{-5}$, $I = 3.35038 \times 10^{-5}$, $J = -2.46865 \times 10^{-5}$, $K = 3.48652 \times 10^{-5}$. This polynomial form constitutes the complex Windshield curvature definition used by the optical designer and closely matches the measured data, as indicated in Table I. The above equation represents "Asphere (1)" in Table II below.

Projection lens system 24 compensates for aberrations arising in head-up display 10. Projection lens system 24 includes four lens elements arranged in a first "field flattener" group 250 of two elements positioned near liquid crystal display 32 and a second or "exit" group 252 of two elements positioned near exit aperture 254 at output end 40. Projection lens system 24 is folded inboard clear of the steering column (not shown) of automobile 12. An internal fold mirror 256 folds optic axis 100 in the region between the two groups of lens elements.

The field flattener group 250 includes a strong positive lens element 258 cemented to a negative element 260. The exit group 252 includes a wedged rotationally nonsymmetric anamorphic asphere 262 and a negative meniscus lens element 264 for color correction. Lens exit aperture 254 (FIG. 10), which determines the field of view characteristics of head-up display 10 is 5 in. in diameter truncated to a 4 in. by 4 in. square, which provides a field of view of rectangular format. The use of lens "doublets" provides color correction. The use of asphere 262 in projection lens 24 introduces asymmetry into projection lens system 24 that causes its focal plane to tilt. The tilt angle 84 of about 12° for display surface 82 on which the source information image appears corrects for the asymmetry in projection lens system 24.

Projection lens system 24 is adaptable for use with a great number of windshields of vehicles of different types and body styles of substituting into exit group 252 an aspheric element 262 characterized by the proper windshield sag properties and adjusting the tilt angle 84 of display surface 82. The remaining lens elements 258, 260, and 264 and fold mirror 256 can be kept constant. This can be done because asphere 262 compensates for the nonsymmetric or "aspheric" aberrations introduced by the particular windshield, and lens elements 258, 260, and 264 correct for spherical and skew ray astigmatism and coma aberrations introduced by the optical system geometry of head-up display 10.

Tables II and III set forth the fabrication data for projection lens system 24.

With reference to Tables II and III, the surfaces a-p correspond in general to lettered surfaces in FIG. 12, where "a" corresponds to the image driver 18 sees and surface "p" corresponds to display surface 84 of liquid crystal display 32. In each instance, the radius of the surface is given and the shape of each surface is spherical except for surfaces a, h, and p which are flat, and surfaces d, e, f, and g which are aspheric and relate to windshield 14 and asphere 262.

TABLE II-continued

LENS FABRICATION DATA

| Surface | Surface Description Radius | Thickness or Separation |
|---|---|---|
| p (image) | Decenter (6) infinite | |

TABLE III

| DECENTER | X | Y | Z | ALPHA | BETA | GAMMA |
|---|---|---|---|---|---|---|
| D (1) | 0.0000 | 0.0000 | 0.0000 | 68.3250 | −2.7120 | 0.0000 |
| D (2) | 0.0000 | 0.0000 | 0.0000 | −68.3250 | 2.7120 | 0.0000 |
| D (3) | 0.0000 | −0.0507 | 0.0000 | 0.0000 | 0.0000 | 0.0000 |
| D (4) | 0.1254 | −1.7579 | 0.0000 | −11.0442 | −0.8880 | −48.5404 |
| D (5) | 0.0000 | 0.0000 | 0.0000 | 6.0793 | 0.0000 | −39.2098 |
| D (6) | 0.0000 | 0.0878 | 0.0000 | −11.9001 | −0.8916 | 0.0000 |

DECENTERING CONSTANT KEY:

| TYPE | ORDER OF APPLICATION |
|---|---|
| DECENTER | DISPLACE (X, Y, Z) |
| | TILT (ALPHA, BETA, GAMMA) |
| | REFRACT AT SURFACE |
| | THICKNESS TO NEXT SURFACE |
| DECENTER AND RETURN | DECENTER (X, Y, ALPHA, BETA, GAMMA) |
| | REFRACT AT SURFACE |
| | RETURN (-GAMMA, -BETA, -ALPHA, -Y, -X) |
| | THICKNESS NEXT TO SURFACE |
| REVERSE DECENTER | REFRACT AT SURFACE |
| | TILT (-GAMMA, -BETA, -ALPHA) |
| | DISPLACE (-Y, X) |
| | THICKNESS TO NEXT SURFACE |

A positive radius indicates the center of curvature is to the right or down in FIG. 12, and a negative radius indicates the center of curvature is to the left or up in FIG. 2. Dimensions are given in inches, and the thickness is the axial distance to the next surface.

TABLE II

LENS FABRICATION DATA

| Surface | Surface Description Radius | Thickness or Separation | |
|---|---|---|---|
| a (image) | infinite | −120.0 | (distance from image to design eye) |
| b (design eye) | | 17.5 | (distance from design eye to pupil) |
| c (pupil) | | 11.5 | (distance from pupil to windshield) |
| d Aspheric windshield | Decenter (1) Asphere (1) | 0.09 | |
| e | Asphere (1) | −0.09 | |
| f | Ashpere (1) Reverse Decenter (2) Decenter (3) | −5.6 | |
| | | −0.0290 | |
| | Decenter (4) | | |
| g Asphere (2) | −1.1084 Return (4) Decenter (5) | | |
| h | infinite Return (5) | −0.0441 | |
| i | −4.3650 | −0.350 | |
| j | −3.0260 | −2.450 | (distance from surface j to optic axis fold point) |
| k (optic axis fold point) | | −2.160 | (distance from optic axis fold point to surface j) |
| l | −2.5590 | −2.2767 | |
| m | 6.1400 | 0.00 | |
| n | 6.140 | −0.750 | |
| o | −3.497 | −1.2414 | |

Aspheric surfaces d, e, and f are described by the three dimensional third order or polynomials set forth above for the sag, and the aspheric surface g for asphere 262 is characterized by the following expression:

$$[(CX)X^2 + (CY)Y^2]/[1 + (1 - (1 + KX)(CX)^2X^2 -$$
$$(1 + KY)(CY)^2Y^2)^{\frac{1}{2}}] + AR((1 - AP)X^2 + (1 + AP)Y^2)^2 +$$
$$BR((1 - BP)X^2 + (1 + BP)Y^2)^3 + CR((1 - CP)X^2 +$$
$$(1 + CP)Y^2)^4 + DR((1 - DP)X^2 + (1 + DP)Y^2)^5],$$

where $CY = -0.19363896$, $KY = 0.018526$, $CX = -0.19652289$, $KX = -0.017610$, $AR = 4.90202 \times 10^{-7}$, $BR = -7.65670 \times 10^{-6}$, $CR = 2.9547 \times 10^{-7}$, $DR = 4.58690 \times 10^{-9}$, $AP = -12.1100$, $BP = 0.115192$, $CP = 0.0738795$, $DP = 0.0471630$. The above equation represents "Asphere (2)" in Table II.

A decenter defines a new coordinate system (displaced and/or rotated) in which subsequent surfaces are defined. Surfaces in Table II following a decenter are aligned on the local mechanical axis (Z-axis) of the new coordinate system. The new mechanical axis remains in use until changed by another decenter. The order in which displacements and tilts are applied on a given surface is specified using different decenter types and generate different new coordinate systems. Decenters used in the design III. The parameters $\alpha$, $\beta$, and $\gamma$, are in degrees.

It will be obvious to those having skill in the art that many changes may be made in the above-described details of the preferred embodiment of the present invention without departing form the underlying principles thereof. For example, additional reflection enhancement may be achieved by using multiple holograms that reflect different wavelengths of light. The scope of the present invention should be determined, therefore, only by the following claims.

We claim:

1. A head-up display system for a vehicle, comprising:
   a vision unit including a vehicle windshield with a reflective surface through which an observer situated inside the vehicle can view an outside world scene and can view an instantaneous display field of view postponed within a total display field of view;
   information source means for providing source information carried by light propagating along a fixed optical axis for reflection by the reflection surface of the vision unit for display within the total display field of view; and
   positioning means operatively connected to the information source means for selectively positioning the information source means at different locations relative to the optical axis in a direction transverse to the optical axis so that the source information is positioned within the instantaneous display field of view for display to the observer.

2. The system of claim 1 which further comprises a projection lens system positioned along the optical path between the reflective surface of the vision unit and the information source means and having optical light-directing properties for compensating for aberrations caused by the reflective surface of the vision unit so that the light reflected by it is of substantially aberration-free character for viewing by an observer.

3. The system of claim 2 in which the vision unit has a primary operational field of view within which the observer views the outside world scene and in which the total display field of view is generally located outside the primary operational field of view.

4. The system of claim 1 in which the vehicle includes a dashboard having a top surface beneath which the information source means is mounted and in which the vision unit comprises a windshield having a major surface bounded by a lower side margin, the top surface of the dashboard being positioned proximal to the lower side margin of the windshield and having an opening through which light carrying the source information propagates to strike the major surface of the windshield.

5. The system of claim 1 which further comprises a projection lens system that conditions the light carrying the source information so that the source information reflected by the vision unit appears to come from a finite distance forward of the vision unit and the observer.

6. The system of claim 5 in which the finite distance ranges from between about two and ten meters forward of the observer.

7. The system of claim 5 in which the projection lens system includes a rotationally nonsymmetric lens element.

8. The system of claim 7 in which the projection lens system includes a plastic lens component.

9. The system of claim 2 in which the projection lens system includes a rotationally nonsymmetric lens element.

10. The system of claim 9 in which the projection lens includes a plastic lens component.

11. The system of claim 1 in which the reflective surface of the vision unit has different curvatures in different sections lying in mutually orthogonal planes.

12. A head-up display system for a vehicle capable of traveling at each of plural vehicle speeds, comprising:
    a vision unit having a reflective surface through which an observer situated inside the vehicle can view an outside world scene;
    information source means for providing source information carried by light propagating along a fixed optical axis for reflection by the reflective surface of the vision unit for display to the observer;
    projection lens means positioned along the optical axis between the reflective surface and the information source means for compensating for aberrations caused by the reflective surface of the vision unit so that the light reflected by it is of substantially aberration-free character for viewing by the observer; and
    positioning means operatively connected to the information source means for positioning the information source means in a direction along the optical axis at plural preselected locations that correspond to respective ones of the plural vehicle speeds so that the projection lens means provides to the observer an image of the source information from a distance corresponding to the vehicle speed.

13. The system of claim 12 in which the vision unit has a primary operational field of view within which the observer views the outside world scene and in which the information source means and the projection lens system cooperate to reflect the source information off the reflective surface of the vision unit within a region generally located outside the primary operational field of view.

14. The system of claim 12 in which the vehicle includes a dashboard having a top surface beneath which the information source means is mounted and in which the vision unit comprises a windshield having a major surface bounded by a lower side margin, the top surface of the dashboard being positioned proximal to the lower side margin of the windshield and having an opening through which light carrying the source information propagates to strike the major surface of the windshield.

15. The system of claim 12 in which the projection lens means conditions the light carrying the source information so that the source information reflected by the vision unit appears to come from a finite distance forward of the vision unit and the observer.

16. The system of claim 15 in which the finite distance ranges from between about two and ten meters forward of the observer.

17. The system of claim 12 in which the projection lens means includes a rotationally nonsymmetric lens element.

18. The system of claim 17 in which the projection lens means includes a plastic lens component.

19. The system of claim 12 in which the reflective surface of the vision unit has different curvatures in different sections lying in mutually orthogonal planes.

* * * * *